United States Patent [19]

Collins et al.

[11] Patent Number: 5,109,834
[45] Date of Patent: May 5, 1992

[54] CART ASSEMBLY FOR BARBEQUE GRILLS

[75] Inventors: Floyd A. Collins, Fortson; Andrew W. Kahler, Columbus; Marvin R. Windham, Cataula, all of Ga.

[73] Assignee: W. C. Bradley Company, Ga.

[21] Appl. No.: 743,080

[22] Filed: Aug. 9, 1991

Related U.S. Application Data

[63] Continuation-in-part of Ser. No. 554,661, Jul. 17, 1990.

[51] Int. Cl.⁵ .............................................. F24C 3/00
[52] U.S. Cl. .............................. 126/41 R; 126/25 R; 126/9 R
[58] Field of Search ..................... 126/41 R, 25 R, 9 R

[56] References Cited

U.S. PATENT DOCUMENTS 4,955,358  9/1990  Harris et al. ................... 126/25 R
5,050,577  9/1991  Baynes et al. .................. 126/41 R Primary Examiner—Carroll B. Dority
Attorney, Agent, or Firm—Hopkins & Thomas

[57] ABSTRACT

A barbecue grill cart assembly is disclosed, the cart having right and left sets of leg members, each set having a front and rear leg connected by a strut that is normally welded to the legs. Each strut has integral studs for receiving the grill casting and facilitating assembly. The cart also includes a front panel with extended flanges for providing a plurality of contact points between the flanges, legs, struts and control panel for preventing twisting or swaying of the assembly.

4 Claims, 1 Drawing Sheet

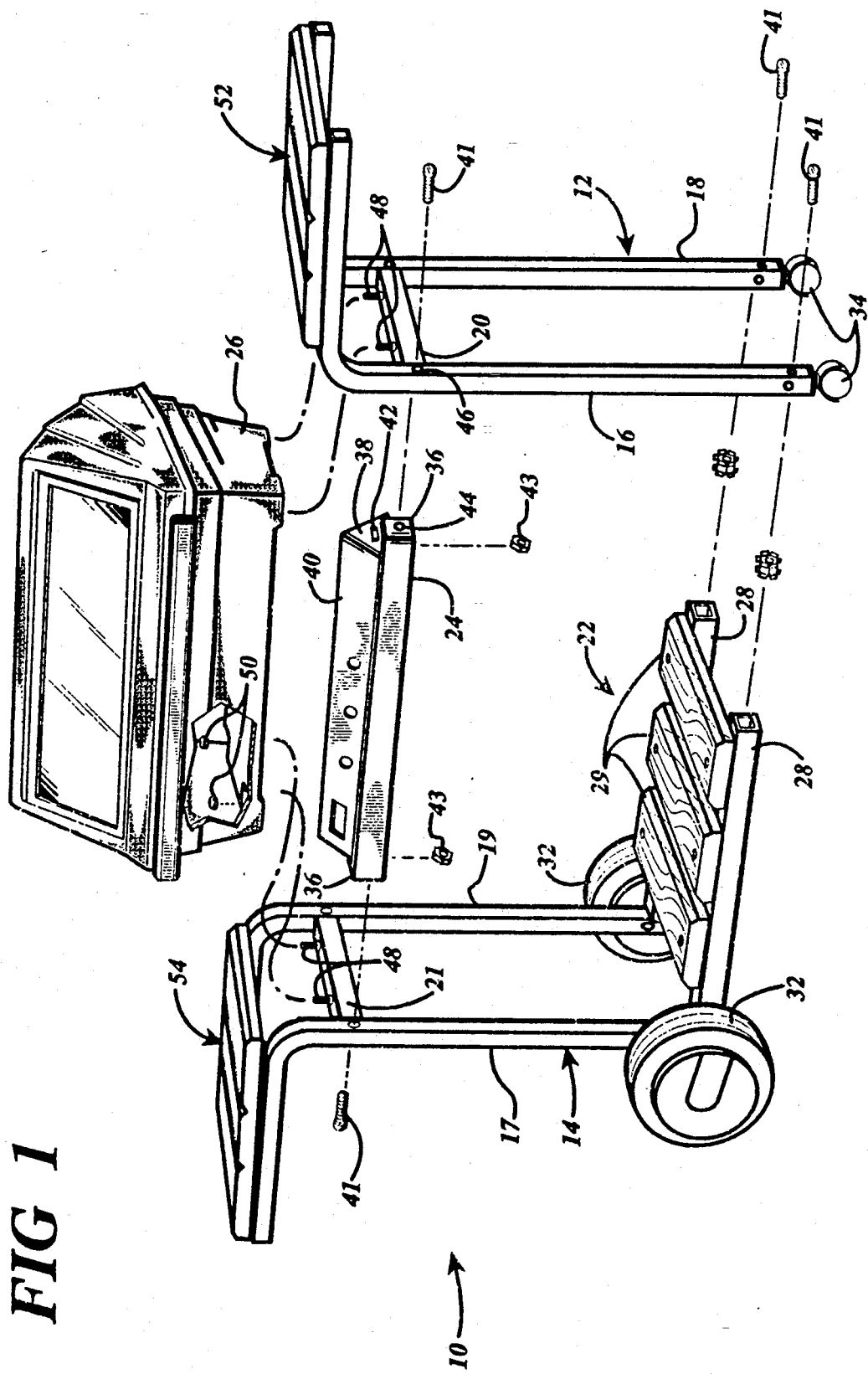

CART ASSEMBLY FOR BARBEQUE GRILLS

This application is a continuation-in-part of co-pending application Ser. No. 554,661, filed Jul. 17, 1990, having a common assignee.

BACKGROUND OF THE INVENTION

Barbecue grill manufacturers commonly supply a wheeled cart with the barbecue grill for mounting the grill and for moving the grill from one location to another. The carts are packed in an unassembled state with the grill for convenience in shipping the product. Such carts, in general, have the grill mounted centrally thereon with the cooking surface located at approximately the waist-level of an adult. The cart may include front, side and/or bottom shelves and wheels or casters on two or four of the legs.

As a result of the elevated mounting of the grill, barbecue grill carts tend to be top heavy. Consequently, the carts must utilize multiple braces or similar means to ensure the stability of the cart. In general, braces are normally provided between the legs of the assembly, extending from front to back and from one side to the other, at both upper and lower regions of the legs. This multiplicity of braces, along with the corresponding fastening means, causes assembly of the cart to be relatively complex and time consuming. In addition, problems are encountered with supply and quality control due to the number of parts which must be supplied for cart assemblies.

A major improvement in cart design is taught by co-pending application Ser. No. 392,790, now, U.S. Pat. No. 4,955,358. The number of braces was reduced substantially while increasing the rigidity of the assembly by providing interlocking of the braces and multiple contact points at each leg. It is to further improvement in cart design as well as to the solving of problems of the prior art with regard to the multiplicity of parts and relative difficulty of assembly that the present invention is directed.

SUMMARY OF THE INVENTION

It is, therefore, one of the principal objects of the present invention to provide a cart assembly for barbecue grills that has a very limited number of structural parts, while exhibiting superior stability.

Another object of the present invention is to provide a cart assembly for barbecue grills that is easily and quickly assembled by a consumer.

A further object of the present invention is to provide a cart assembly for barbecue grills that provides economies in manufacturing and in packaging and which is durable for providing a long service life.

These and other objects are attained by the present invention which relates to a cart assembly for barbecue grills that is generally rectangular in shape and normally includes wheels for mobility and an LP gas tank as a fuel source. The cart assembly includes right and left sets of leg means with a front and rear leg set being permanently fastened together to form a leg assembly, thus forming the sides of the cart assembly. In conjunction with the means used to fasten the front and rear leg members together, integral mounting means are provided for receiving and securing the bottom grill casting or firebox thereto. Strut means are provided to connect the right and left sets of leg means at their lower ends. The cart assembly also includes a control panel to connect the right and left assemblies at their upper end and the grill casting itself serves as a structural element. Side, front, and bottom shelves may also be provided.

Various additional objects and advantages of the present invention will become apparent from the following detailed description, with reference to the accompanying drawings.

BRIEF DESCRIPTION OF THE DRAWINGS

FIG. 1 is an exploded perspective view of the present cart assembly, illustrating the integral casting mounting means.

DETAILED DESCRIPTION OF THE PREFERRED EMBODIMENT

Referring now more specifically to the drawings, and to FIG. 1 in particular, numeral 10 designates generally the present barbecue grill cart assembly. The cart is shown in exploded form with a barbecue grill shown to illustrate the mounting arrangement. The structural members of the cart will normally be fabricated from steel to provide the necessary strength and resistance to heat; however, other suitable materials having these qualities may also be utilized.

The present cart includes a right side leg assembly 12 and a left side leg assembly 14. Each leg assembly includes a front and rear leg and a connecting strut means extending therebetween. Thus, the right leg assembly 12 includes a front leg 16, a rear leg 18, and a connecting strut 20. The left side leg assembly includes a front leg 17, a rear leg 19 and a connecting strut 21. The connecting struts 20 and 21 are disposed perpendicular to and near the upper ends of the legs 16 and 18, and 17 and 19, respectively, and are fastened therebetween, preferably by welding. The struts between the front and rear legs may be secured thereto in other suitable ways; however, welding is preferred for its strength, structural integrity, and the fact that the combined front and rear leg sets are assembled during manufacture and prior to shipment. This provides economies in packaging the cart assembly as the packer need only make sure that there are two leg assemblies in the carton rather than four legs, eight braces, etc. In addition, since the barbecue grill and cart assembly are shipped in an unassembled condition, assembly by the consumer is greatly simplified.

In the embodiment shown in FIG. 1, the right and left side leg assemblies are secured to one another by a bottom shelf means 22, disposed perpendicularly thereto and near the lower ends of the leg assemblies in one plane, and by a control panel 24 and the grill 26, disposed near the upper end of the leg assemblies in a parallel plane. The bottom shelf is formed with strut members 28 which extend horizontally between the cart legs, being secured thereto in a suitable manner, as with butterfly nuts. Disposed perpendicularly to the struts 28 are shelf members 29 which extend across the parallel struts 28 and are secured thereto in a suitable manner. At the left side of the cart, as viewed in FIG. 1, the large wheels 32 are secured to the leg members 17 and 19, respectively. At the right side of the cart, as viewed in FIG. 1, the legs receive casters 34, which are inserted into the legs from the bottom. This construction is described in co-pending application Ser. No. 554,661, having a common assignee. The relevant material from the co-pending application is incorporated herein by reference.

At the upper end of the leg assemblies, connection across the front is provided by control panel 24. The panel includes a laterally extending flange 36 on each side thereof. These flanges and the main body portion 38 of the control panel 24 define a recess therebetween for receiving the front legs. The main body portion 38, which depends from the sloping control panel 40, provides a contact point for the leg members on either side thereof. In addition an abutment means 42 is provided in body portion 38, the abutment means resting on struts 20 and 21 when assembled. Thus, multiple contact points, the contact points including the flanges 36, the body portions 38, the abutments 42, and the struts 20 and 21, are provided to prevent racking or twisting of the cart assembly. The control panel flanges are then secured to the legs with a suitable fastening means such as a bolt 41 and nut 43, through corresponding apertures 44 in the flanges and 46 in the leg members.

Further securement at the upper ends of the leg assemblies is provided by the barbecue grill casting 26 which rests on and is bolted to the struts 20 and 21, utilizing two integral studs 48 for each side. The studs are permanently secured to the struts 20 and 21 and extend upwardly from the struts 20 and 21 and into the casting 26 through apertures formed therein, where they are secured by nuts 50. This construction facilitates rapid assembly of the grill and cart, the grill being easily located on the studs 48, and the permanent fastening of the studs to the side struts provides additional stability to the overall assembly. The side shelves 52 and 54 are then secured to each side of the cart assembly, at the upper ends of the leg members.

The grill 26 may be fueled with an LP gas tank (not shown), which is mounted on the bottom shelf assembly 22 in any suitable manner, such as with securing clips or other receiving means. The grill may also be fueled with natural gas or charcoal. The cart assembly may also include a front shelf, a front wire basket, or a front panel disposed between the front legs for concealing the gas tank.

It can thus be appreciated by those skilled in the art that a novel barbecue grill cart assembly and modifications thereof have been shown and described in detail herein. Various additional changes and modifications may be made without departing from the scope of the present invention.

I claim:

1. A barbecue grill cart assembly for receiving a barbecue grill comprising a pair of generally vertical leg member assemblies each having a front leg and a rear leg with spaced, opposing, generally horizontal strut means connected to said front and rear leg members, said strut means having an upper surface for receiving a barbecue grill, and integral stud means projecting generally vertically therefrom and extending into the barbecue grill for securing the grill thereto, a front panel member having outwardly extending flange means for engaging said leg members adjacent the point of connection of said strut means to said front leg members for providing a plurality of contact points to prevent twisting and swaying of said leg member, and securing means disposed through said flange means and said leg members for fastening said assembly together.

2. A barbecue grill cart assembly as defined in claim 1 in which said front panel member includes a main body portion for engaging said front leg members for providing an additional contact point.

3. A barbecue grill cart assembly as defined in claim 2 in which said main body portion includes an abutment means for engaging said strut means.

4. A barbecue grill cart assembly as defined in claim 1 in which said front panel member includes abutment means for engaging said strut means.

* * * * *